United States Patent
Sharma

(10) Patent No.: US 10,599,649 B2
(45) Date of Patent: Mar. 24, 2020

(54) REAL TIME QUERY PLANNER STATISTICS WITH TIME BASED CHANGING

(71) Applicant: MICROSOFT TECHNOLOGY LICENSING, LLC, Redmond, WA (US)

(72) Inventor: Atri Sharma, Bangalore (IN)

(73) Assignee: Microsoft Technology Licensing, LLC, Redmond, WA (US)

(*) Notice: Subject to any disclaimer, the term of this patent is extended or adjusted under 35 U.S.C. 154(b) by 227 days.

(21) Appl. No.: 15/384,589

(22) Filed: Dec. 20, 2016

(65) Prior Publication Data

US 2018/0173712 A1    Jun. 21, 2018

(51) Int. Cl.
  *G06F 16/00*    (2019.01)
  *G06F 16/2453*    (2019.01)

(52) U.S. Cl.
  CPC .............................. *G06F 16/24542* (2019.01)

(58) Field of Classification Search
  CPC .................... G06F 17/30088; G06F 16/24542
  USPC ......................................... 707/649, 688, 803
  See application file for complete search history.

(56) References Cited

U.S. PATENT DOCUMENTS

| | | | |
|---|---|---|---|
| 6,363,371 B1 | 3/2002 | Chaudhuri et al. | |
| 7,831,592 B2 | 11/2010 | Markl et al. | |
| 7,877,374 B2* | 1/2011 | Zabback | G06F 16/24545 707/713 |
| 7,917,502 B2 | 3/2011 | Cheng et al. | |
| 7,984,024 B2 | 7/2011 | Bossman et al. | |
| 8,595,194 B2 | 11/2013 | Cormode et al. | |
| 8,775,413 B2 | 7/2014 | Brown et al. | |
| 8,812,481 B2 | 8/2014 | Zuzarte et al. | |
| 8,812,485 B2 | 8/2014 | Chen et al. | |
| 8,943,103 B2 | 1/2015 | Annapragada | |
| 10,169,707 B1* | 1/2019 | Nadler | G06F 16/244 |
| 2004/0243555 A1 | 12/2004 | Bolsius et al. | |
| 2006/0149695 A1* | 7/2006 | Bossman | G06F 16/221 706/48 |
| 2008/0046455 A1 | 2/2008 | Behm et al. | |
| 2009/0106219 A1 | 4/2009 | Belknap et al. | |
| 2009/0327216 A1 | 12/2009 | Brown et al. | |
| 2012/0109936 A1 | 5/2012 | Zhang et al. | |
| 2016/0171034 A1* | 6/2016 | Konik | G06F 16/116 707/803 |

OTHER PUBLICATIONS

Berg, et al., "Analysis of a dynamic query optimization technique for multi-join queries", In Journal of Systems and Software, vol. 27, Issue 3, Dec. 1994, 12 pages.

* cited by examiner

*Primary Examiner* — Chelcie L Daye
(74) *Attorney, Agent, or Firm* — Workman Nydegger

(57) ABSTRACT

Systems are disclosed for modifying weighting of database components by a query planner based on component volatility. The systems obtain a plurality of snapshots of one or more datasets that include one or more data components, and from the plurality of snapshots, the system identifies the volatility of each data component. The systems further generate a plurality of separate dynamic weights for each data component and initiates application of the separate dynamic weights by the query planner to the one or more data components. In some instances, the weights differentially affect the computational cost for query plans based in a time-dependent fashion and are applied prior to calculating costs of the query plans.

20 Claims, 5 Drawing Sheets

300

| Component | Weight($t_1$) | Weight($t_2$) | | Weight($t_n$) |
|---|---|---|---|---|
| statistic_col1 | 0.562 | 0.053 | | 0.001000 |
| statistic_col2 | 0.125 | 0.120 | | 0.075000 |
| statistic_col3 | 0.004 | 0.001 | | 0.000001 |
| statistic_col4 | 0.050 | 0.025 | ... | 0.005000 |
| statistic_col5 | 0.890 | 0.889 | | 0.250000 |
| statistic_col6 | 0.750 | 0.500 | | 0.101000 |
| statistic_col7 | 0.958 | 0.959 | | 0.850000 |
| statistic_col8 | 1 | 0.999 | | 0.985000 |
| statistic_col9 | 0.356 | 0.052 | | 0.000100 |

*600*

*610*

Dataset 1

| Suppliers | |
|---|---|
| Name | Country |
| Manufacturer | China |
| Middle Man | Us |

*620*

Dataset 2

| Shipment Invoice | | |
|---|---|---|
| Item | # | Price |
| Basketball | 20 | $2.00 |
| Basketball Net | 10 | $1.00 |
| Backboard | 3 | $400.00 |

*630*

Dataset 3

| Store Inventory | | |
|---|---|---|
| Item | # | Price |
| Baseball | 40 | $3.00 |
| Bat | 8 | $75.00 |
| Basketball | 1 | $20.00 |
| Rim | 2 | $30.00 |
| Soccer Ball | 1 | $10.00 |
| Tennis Ball | 300 | $15.00 |
| Tennis Racket | 45 | $60.00 |

| Computational Cost | | | | |
|---|---|---|---|---|
| | $time_1$ | $time_2$ | ... | $time_n$ |
| Query Plan 1 | 1 | 2 | | 2 |
| Query Plan 2 | 2 | 1 | | 3 |
| Query Plan 3 | 3 | 3 | | 1 |

*Figure 6B*

REAL TIME QUERY PLANNER STATISTICS WITH TIME BASED CHANGING

BACKGROUND

Database are useful for storing and categorizing data in such a manner that the stored data can be accessed, analyzed and/or otherwise utilized through one or more queries performed on the databases by a database application.

A database application allows a user to interact with a database server by submitting server commands to the database that cause the database server to perform an operation or a set of operations on data within the databases and/or on the databases, themselves. Database commands, which include database queries, are input in a text-based form at the database application using any database language known in the art and which the database server supports. One exemplary database language supported by many database servers is the Structured Query Language (SQL). Additional non-limiting examples of database languages include Datalog, Data Mining Extensions (DMX), Language Integrated Query (LING), and XML Query (XQuery).

Like many database languages, SQL is a declarative language. Commands written in a declarative language describe a desired result or what the program must accomplish (i.e., the logic of a computation) and allow the computing system to determine how to accomplish the set of operations necessary to arrive at the commanded outcome. This is in contrast to imperative programming languages, which provide the computing system with a defined set of ordered instructions to process—the how for achieving a desired result.

While commands written in an imperative language provide precise computing instructions, they lack the flexibility and conciseness often associated with commands written in declarative languages. Further, declarative languages are particularly useful when it comes to accessing information from a database. Typically, a user knows what information they are searching for in a database or what the desired outcome is, but they may not know a precise order of operations necessary to achieve the final result or even the most efficient order of operations for doing so. By writing a database command in a declarative language, the user need only provide the desired result and allow the computing system to determine the required steps and order of operations necessary to return the appropriate result.

As a natural consequence of processing commands written in a declarative language, the database server must determine which actions to perform to accomplish the desired result and then perform those actions. The act of preparing for performance of those actions is generally referred to as "compiling" the database command, while performing the actions is generally referred to as "executing" the database command.

As part of compiling the database command, a database server creates or identifies a "query plan" for executing the database command. A query plan is a data structure that represents a set of operations or a series of steps or actions which, when executed by the database server, accomplish the desired result indicated by the database command. There is often not a single query plan associated with a given database command, but rather, there are often a variety of alternative query plans identified that, when executed, produce the same, correct result for the given database command. In some instances, a program called a "query planner" may be used at the compiling step to determine available query plans.

Although each query plan may arrive at a same, correct result, not all query plans are created equal. Some query plans may be more desirable than other query plans. There is often a wide range of performance related factors that affect the desirability of executing each query plan. Performance factors include, for example, database configurations, hardware configurations, compilation and execution environment parameters, database user profiles, and/or the number of concurrent database users. Changes in one or more of the foregoing factors typically cause a change in execution efficiency of query plans, and methods for altering and/or optimizing performance related factors are known in the art.

In addition to performance-related factors affecting the desirability of executing one query plan over another, computational costs associated with each query plan may also be considered. Computational costs include such things as the processing time and efficiency of executing a query plan, and it is advantageous for a database server to execute a database command using a query plan that performs relatively quickly or efficiently compared to other alternative query plans. Such a query plan may be referred to as an optimal query plan or a least computationally expensive query plan.

A database server typically relies on a query planner to predict the computational cost of each query plan and further relies on a module known as a "query optimizer" to identify the optimal query plan. As discussed below, the query optimizer may, in some embodiments, be the same module as the query planner. Regardless, the query planner typically predicts the costs of each query plan, and the query optimizer receives and/or analyzes the computational cost for each query plan and selects an optimal query plan to be executed based on the computational costs.

For a given query plan, the predicted cost analysis includes, among other elements, estimating the cost of performing each step in the sequence of steps specified in the given query plans. The cost estimates for each step are often based on database statistics, which can be time-specific snapshots of one or more database components and which can introduce inherent uncertainties in the query optimizer's cost analysis.

Basing computational costs on such factors may result in errors in cost estimations. This is particularly problematic if query planners rely on database statistics that have become stale or out-of-date when predicting computational costs. For example, tables or indexes subject to substantial data change operations (e.g., insert, update, delete, or merge) often undergo changes in their data distribution and subsequently render any associated statistic stale or out-of-date, as the respective statistic no longer reflects the current data distribution of the given data component. In such instances, the predicted performance cost of a query plan incorporating out-of-date statistics is likely to be significantly different than its actual performance cost when executed, and because the query optimizer relies on the predicted computational costs and not the actual computational costs when selecting an optimal query plan, the query optimizer is likely to err in identifying a query plan that has optimal performance for a database command.

Because stale or out-of-date statistics can cause the inefficient execution of database commands, traditional solutions revolve around updating the statistics. However, updating statistics is an expensive process that requires an allocation of both time and computational resources. Additionally, when statistics are being updated, any associated data components cannot be queried. This adds additional time to processing requests and generally decreases the efficiency of the database server, its operations, and processing of database commands. Thus, existing systems have a difficult time balancing the frequency in which statistics are updated and the losses in efficiency associated with executing non-optimal query plans that are chosen based on cost calculations that incorporate stale statistics.

Accordingly, there is an ongoing need for improved systems for performing queries and for executing query plans on databases.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Embodiments of the present disclosure include systems, methods, and computer program products for modifying weighting of database components by a query planner based on component volatility.

In some embodiments, a computer system is configured for modifying weighting of database components by a query planner based on component volatility by obtaining snapshots of data components within datasets and identifying the volatility of each data component from the snapshots. Based on the volatility, the computing system is configured for generating a separate dynamic weight for each of the data components, and initiating application of the different dynamic weights to the data components.

In some embodiments, a computing system is configured for updating the dynamic weights by obtaining an additional snapshot and detecting a volatility change of the data components. Based on the volatility changes, the computing system is configured for calculating dynamic weights and provided the dynamic weights to a query planner for calculating a computational cost for different query plans. The computing system may be further configured for initiating a selection by a query planner of a least computationally expensive query plan.

Some embodiments are provided for calculating a computational cost based at least in part on dynamic weights that automatically update and differentially affect the computational cost for each query plan in a time-dependent fashion. A dynamic weight may be calculated at any given time and may be referenced as y(t); y(t) being equal to a product of $y(0)$ and $e^{kt}$, where $y(0)$ is an initial value of the dynamic weight, e is the mathematical constant that is a base of the natural logarithm, k is a specified constant, and t is an amount of elapsed time.

In some embodiments, methods and systems are also provided for modifying weighting of database components by a query planner based on component volatility and includes obtaining snapshots data components within datasets, identifying the volatility of each data components from the snapshots, generating different dynamic weights for each of the data components based on volatility, and initiating application of the different dynamic weights by a query planner to the data components.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above recited and other advantages and features of the disclosure can be obtained, a more particular description of the disclosure briefly described above will be rendered by reference to specific embodiments thereof, which are illustrated in the appended drawings. It is appreciated that these drawings depict only typical embodiments of the disclosure and are not therefore to be considered to be limiting of its scope.

In the drawings, multiple instances of an element may each include separate letters appended to the element number. For example, two instances of a particular element "100" may be labeled as "100A" and "100B." In that case, the element label may be used without an appended letter (e.g., "100") to generally refer to every instance of the element, while the element label will include an appended letter (e.g., "100A") to refer to a specific instance of the element. Similarly, a drawing number may include separate letters appended thereto. For example, FIG. 6 may include FIG. 6A and FIG. 6B. In that case, the drawing number may be used without the appended letter (e.g., FIG. 6) to generally refer to every instance of the drawing, while the drawing label will include an appended letter (e.g., FIG. 6A) to refer to a specific instance of the drawing. The disclosure will be described and explained with additional specificity and detail through the use of the accompanying drawings in which:

FIG. 6A illustrates exemplary datasets acted upon by a computing system for weighting data components based on volatility, according to one or more embodiments of the present disclosure; and FIG. 6B illustrates a table reciting the computational cost of various query plans over time, according to one or more embodiments of the present disclosure.

DETAILED DESCRIPTION

Embodiments of this disclosure include systems, methods, and computer program products for modifying weighting of database components based on component volatility and, in some embodiments, calculating a computational cost for query plans based at least in part on the weighted database components and selecting a least computationally expensive query plan based on the calculated computational costs. This can, in some instances, increase the efficiency of database servers by differentially and dynamically weighting database components to affect computational costs, thereby promoting the selection of more optimum query plans over what is otherwise possible with traditional static methods of query plan cost estimation and selection, even through the passage of time and/or despite changes to underlying data.

The methods disclosed herein are implemented by one or more computing system It will be appreciated that computing systems are increasingly taking a wide variety of forms. Computing systems may, for example, be handheld devices, appliances, laptop computers, desktop computers, mainframes, distributed computing systems, datacenters, or even devices that have not conventionally been considered a computing system, such as wearables (e.g., glasses). In this description and in the claims, the term "computer system" or "computing system" is defined broadly as including any device or system—or combination thereof—that includes at least one physical and tangible processor and a physical and tangible memory capable of having thereon computer-executable instructions that may be executed by a processor. The memory may take any form and may depend on the nature and form of the computing system. A computing system may be distributed over a network environment and may include multiple constituent computing systems.

Figure 1:
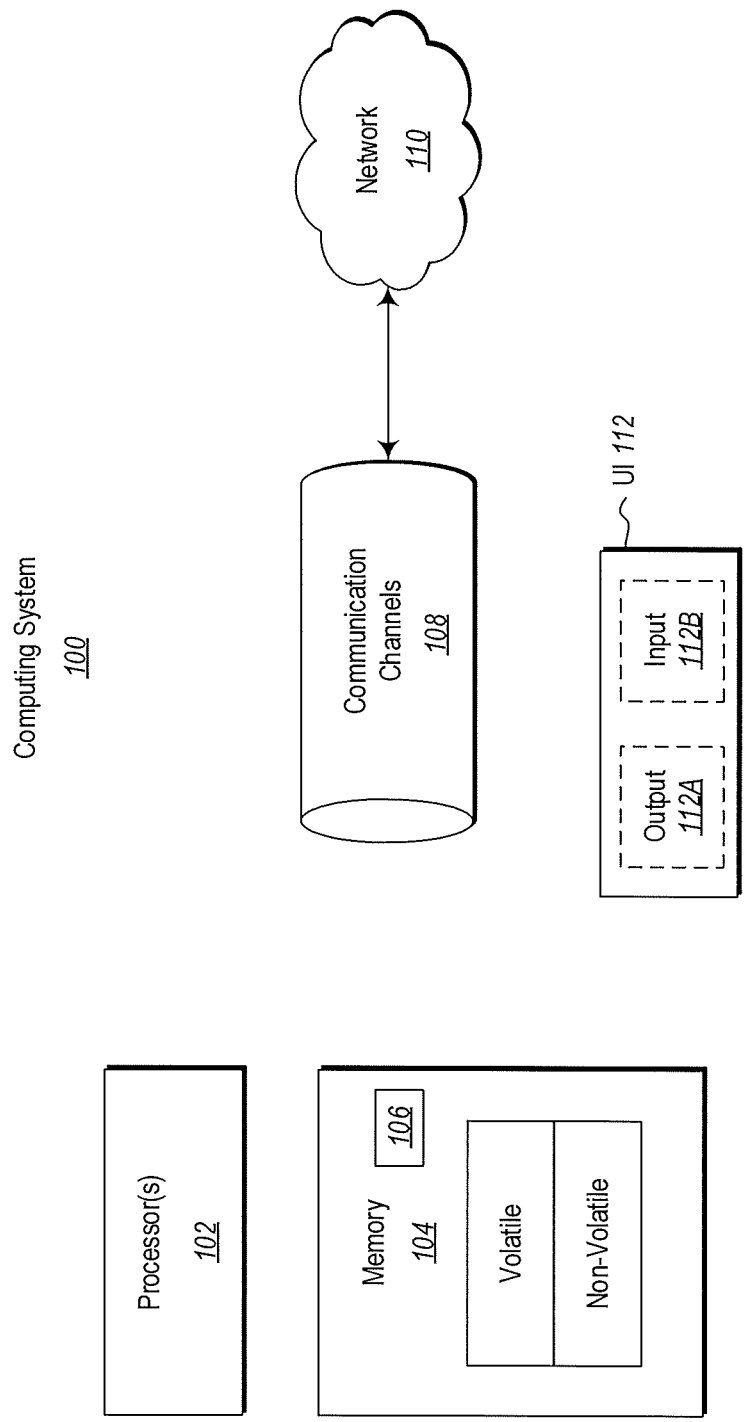
FIG. 1 illustrates a schematic representation of a computing system, according to one or more embodiments of the present disclosure.

As illustrated in FIG. 1, in its most basic configuration, a computing system 100 typically includes at least one hardware processing unit 102 and memory 104. The memory 104 may be physical system memory, which may be volatile, non-volatile, or some combination of the two. The term "memory" may also be used herein to refer to non-volatile mass storage such as physical storage media. The computing system 100 may be a standalone or distributed system. If the computing system is distributed, the processing, memory, and/or storage capability may be distributed as well.

Any number and/or type of general purpose or special purpose computing systems described above can be configured to store a database or a plurality of databases. For example, the database(s) may be stored in the memory 104 of computing system 100, and for the purpose of this disclosure, any general purpose or special purpose computer storing at least a portion of one or more databases will be generally referred to as a database server. It should be appreciated, however, that the term "database server" as used herein should also be understood to include the backend system of a database application that performs tasks such as data analysis, storage, data manipulation, archiving, and other non-user specific tasks.

The computing system 100 also has thereon multiple structures often referred to as an "executable component." For instance, the memory 104 of the computing system 100 is illustrated as including executable component 106. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods, and so forth, that may be executed by one or more processors on the computing system, whether such an executable component exists in the heap of a computing system, or whether the executable component exists on computer-readable storage media.

The structure of the executable component exists on a computer-readable medium in such a form that it is operable, when executed by one or more processors of the computing system, to cause the computing system to perform one or more function, such as the functions and methods described herein. Such a structure may be computer-readable directly by the processors—as is the case if the executable component were binary. Alternatively, the structure may be structured to be interpretable and/or compiled—whether in a single stage or in multiple stages—so as to generate such binary that is directly interpretable by the processors. Such an understanding of exemplary structures of an executable component is well within the understanding of one of ordinary skill in the art of computing when using the term "executable component."

The term "executable component" is also well understood by one of ordinary skill as including structures that are implemented exclusively or near-exclusively in hardware, such as within a field programmable gate array (FPGA), an application specific integrated circuit (ASIC), Program-specific Standard Products (ASSPs), System-on-a-chip systems (SOCs), Complex Programmable Logic Devices (CPLDs), or any other specialized circuit. Accordingly, the term "executable component" is a term for a structure that is well understood by those of ordinary skill in the art of computing, whether implemented in software, hardware, or a combination. In this description, the terms "component," "service," "engine," "module," "control," "generator," or the like may also be used. As used in this description and in this case, these terms—whether expressed with or without a modifying clause—are also intended to be synonymous with the term "executable component," and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied on one or more computer-readable media that form a computer program product. An example of such an operation involves the manipulation of data.

The computer-executable instructions (and the manipulated data) may be stored in the memory 104 of the computing system 100. Computing system 100 may also contain communication channels 108 that allow the computing system 100 to communicate with other computing systems over, for example, network 110.

While not all computing systems require a user interface, in some embodiments the computing system 100 includes a user interface 112 for use in interfacing with a user. The user interface 112 may include output mechanisms 112A as well as input mechanisms 112B. The principles described herein are not limited to the precise output mechanisms 112A or input mechanisms 112B as such will depend on the nature of the device. However, output mechanisms 112A might include, for instance, speakers, displays, tactile output, holograms and so forth. Examples of input mechanisms 112B might include, for instance, microphones, touchscreens, holograms, cameras, keyboards, mouse or other pointer input, sensors of any type, and so forth.

Accordingly, embodiments described herein may comprise or utilize a special purpose or general-purpose computing system. Embodiments described herein also include physical and other computer-readable media for carrying or storing computer-executable instructions and/or data structures. Such computer-readable media can be any available media that can be accessed by a general purpose or special purpose computing system. Computer-readable media that store computer-executable instructions are physical storage media. Computer-readable media that carry computer-executable instructions are transmission media. Thus, by way of example—not limitation—embodiments of the invention can comprise at least two distinctly different kinds of computer-readable media: storage media and transmission media.

Computer-readable storage media include RAM, ROM, EEPROM, solid state drives ("SSDs"), flash memory, phase-change memory ("PCM"), CD-ROM or other optical disk storage, magnetic disk storage or other magnetic storage devices, or any other physical and tangible storage medium which can be used to store desired program code in the form of computer-executable instructions or data structures and which can be accessed and executed by a general purpose or special purpose computing system to implement the disclosed functionality of the invention.

Transmission media can include a network and/or data links which can be used to carry desired program code in the form of computer-executable instructions or data structures and which can be accessed and executed by a general purpose or special purpose computing system. Combinations of the above should also be included within the scope of computer-readable media.

Further, upon reaching various computing system components, program code in the form of computer-executable instructions or data structures can be transferred automatically from transmission media to storage media (or vice versa). For example, computer-executable instructions or data structures received over a network or data link can be buffered in RAM within a network interface module (e.g., a "NIC") and then eventually transferred to computing system RAM and/or to less volatile storage media at a computing system. Thus, it should be understood that storage media can be included in computing system components that also—or even primarily—utilize transmission media.

Although the subject matter described herein is provided in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, tablets, mobile telephones, PDAs, pagers, routers, switches, datacenters, wearables (e.g., glasses) and the like. The invention may also be practiced in distributed system environments where local and remote computing systems, which are linked (either by hardwired data links, wireless data links, or by a combination of hardwired and wireless data links) through a network, both perform tasks. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

A cloud-computing model can be composed of various characteristics, such as on-demand self-service, broad network access, resource pooling, rapid elasticity, measured service, and so forth. A cloud-computing model may also come in the form of various service models such as, for example, Software as a Service ("SaaS"), Platform as a Service ("PaaS"), and Infrastructure as a Service ("IaaS"). The cloud-computing model may also be deployed using different deployment models such as private cloud, community cloud, public cloud, hybrid cloud, and so forth.

As described above, many databases are configured to stored data that is accessible through one or more queries of a query plan. Some applications are configured to evaluate and select a query plan from a plurality of query plans based on a predicted cost analysis including estimating the cost of performing each step in the sequence of steps specified in the given query plans. The cost estimates for each step are often based on database statistics, which can be time-specific snapshots of one or more database components.

Once the cost estimates are completed for the queries/query plans, a query optimizer selects the optimal query plan by determining which query plan involves the sequence of steps with the optimal predicted costs. For purposes of this application, an optimal query plan is a query plan having costs, relative to the costs of other query plans in a group of identified query plans, best meet criteria of optimality established for the database server. Thus, the term "optimal" may have different meanings depending on which types of costs are considered and how those costs are weighed. In some embodiments, the optimal query plan is the query plan that is the least computationally expensive query plan.

Criteria identifying costs to be considered in judging optimality, as well as the weightings for those costs, may be defined in the code of the database server or configured by administrators of the database server. Cost criteria may include a variety of factors including speed and resource usage. For example, some database server configurations may weight a query plan that processes more quickly as more optimal than one that uses less memory, while other database server configurations may prefer alternative cost weightings for judging optimality. A query plan whose costs meet criteria of optimality established for the database are said to have "a lower cost" or "a lower computational cost" than other query plans that do not meet the criteria of optimality established for the database.

As explained above, when predicting the costs of query plans and selecting an optimal query plan therefrom, query planners typically rely on predictive cost-based techniques to determine which of the query plans will result in optimal performance. However, there are inherent uncertainties in the query optimizer's cost analysis. For example, to predict the costs for any given step in a query plan, the query planner typically relies on such things as database statistics.

Because stale or out-of-date statistics can cause the inefficient execution of database commands, traditional solutions revolve around updating the statistics. However, updating statistics is an expensive process that requires an allocation of both time and computational resources. Additionally, when statistics are being updated, any associated data components cannot be queried. This adds additional time to processing requests and generally decreases the efficiency of the database server, its operations, and processing of database commands. Thus, a central problem in database system management is balancing the frequency in which statistics are updated with the losses in efficiency associated with executing non-optimal query plans that are chosen based on cost calculations that incorporate stale statistics.

Computing Systems Employing Dynamic Weighting of Database Components

Disclosed embodiments include a computing system that increases the efficiency of database servers by differentially and dynamically weighting database components to affect computational costs, thereby promoting the selection of a more optimum query plan over what is otherwise possible with traditional static methods of query plan cost estimation and selection. In some embodiments, and as described below, the computing system increases the likelihood an optimum query plan is selected and executed, even through the passage of time and/or despite changes to underlying data.

Figure 2:
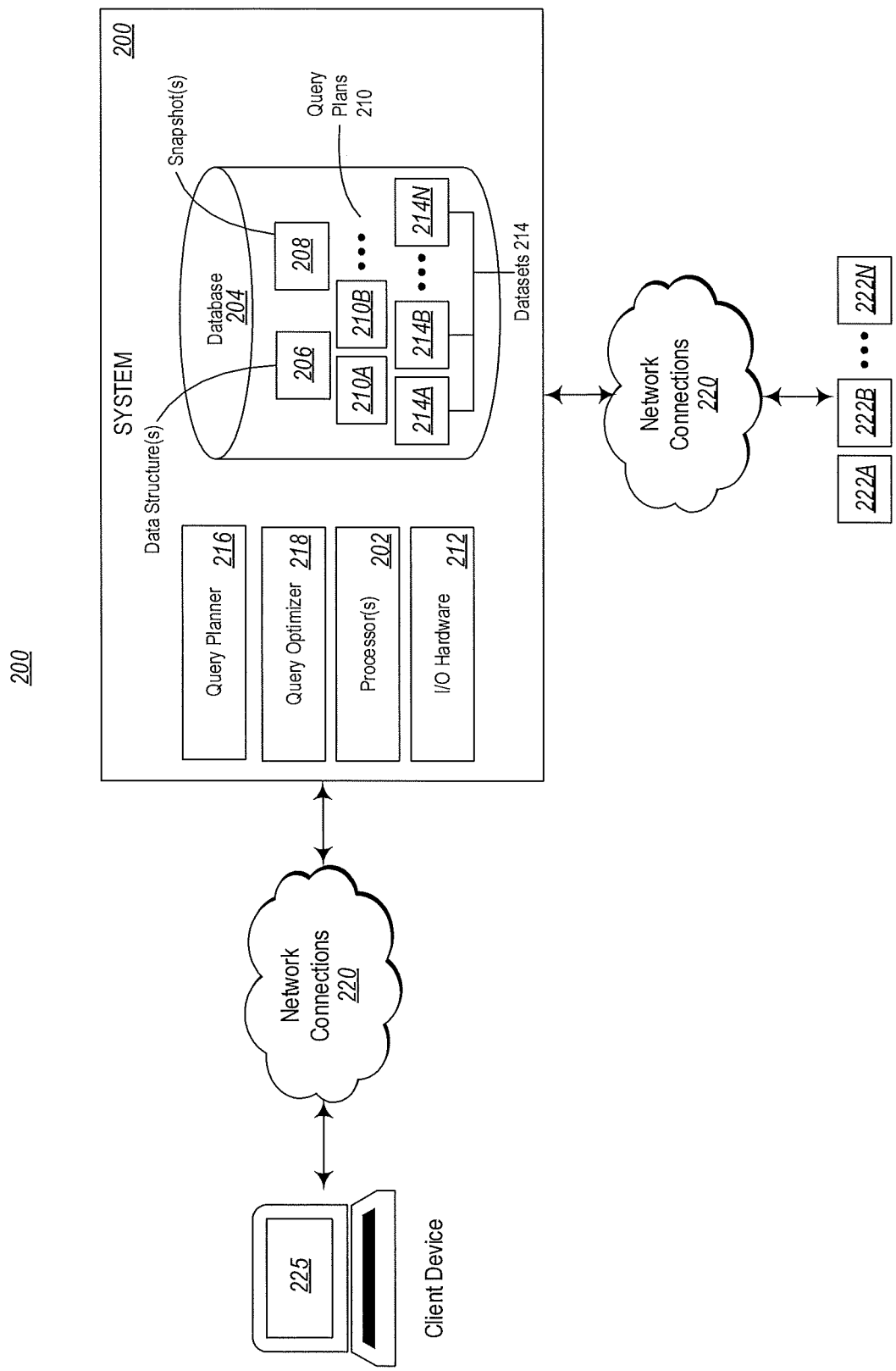
FIG. 2 illustrates a schematic representation of a computing system for weighting of database components, according to one or more embodiments of the present disclosure.

Referring now to FIG. 2, an exemplary computing system 200 is illustrated, which includes components described above in regard to FIG. 1. In some embodiments, the computing system 200 is a database server. The computing system 200 includes processor(s) 202, a database 204, a query planner 215, a query optimizer 218, and I/O hardware 212.

The computing system 200 also includes one or more processors 202. The processors 202 may be hardware processors and may also include software processors, in some instances. Also as described above, the processors 202 may direct the operation of a computing system 200 in response to computer-executable instructions and may be used in the computing system 200 to, for example, manipulate data and/or calculate one or more values. Additional exemplary implementations of the processors 202 within the computing system 200 are elucidated below where appropriate.

The computing system 200 includes a database 204, which may, in some embodiments, be stored within computer-readable storage media (e.g., system memory comprising volatile and/or non-volatile memory) of the computing system 200. As illustrated in FIG. 2, the database 204 includes a plurality of datasets 214, one or more snapshots 208, query plans 210, and one or more data structures 206.

The database 204 includes a plurality of datasets 214. The datasets 214 individually comprise one or more tables or indexes of numerical and/or non-numerical data. The database 204 can store any number and/or type of dataset 214, and each dataset 214A, 214B, and 214N can individually comprise one or more data components that describe structural aspects of the dataset 214 and/or other descriptive aspects of the dataset 214 (e.g., the number of rows and/or columns in the dataset, the distribution of data values in one or more columns within the dataset, etc.), any of which may be partially or entirely dependent or independent from one or more other data components in the same or different dataset.

One or more datasets 214A, 214B, 214N of database 204 are subject to data change operations (e.g., insert, update, delete, or merge) that may, in some embodiments, substantially change one or more data components associated therewith. For example, a dataset 214A may comprise a list of employees' names with a first column representing employees' first names and a second column representing employees' surnames. Possible data change operations that may be performed on the dataset 214A include, as non-limiting examples, inserting a new row within the dataset 214A that includes the name of a newly hired employee, updating an existing employee's surname following a legal name change, and deleting a row representing the name of an employee who resigned.

In each of the foregoing examples, the data change operation may be of any conceivable magnitude, the magnitude being a quantitative or qualitative measure relative to the size of the dataset. In the aforementioned examples describing single insertions, updates, or deletions to the dataset 214A, the magnitude of each data change operation may be qualitatively low if the dataset 214A represents a list of every employee in a large corporation (e.g., greater than 1,000 distinct values). On the other hand, the magnitude of each data change operation may be qualitatively high if the dataset 214A represents a list of every employee in an early stage startup company (e.g., less than 5 distinct values).

Due to possible variations in the size, content, and/or other factors associated with a given dataset, the magnitude of one or more data change operations on the given dataset may additionally, or alternatively, be expressed as a quantitative measure. In some embodiments, a proportional representation of the one or more changes to one or more factors of the dataset may be provided and/or recorded. For example, a quantitative measure may be represented as a percent or proportional change from the unaltered dataset. Building on the foregoing examples of single insertions, updates, or deletions to the dataset 214A, the magnitude of each data change operation may be quantitatively measured as a proportion of changes made with respect to the total number of rows in the dataset. For example, if the dataset 214A represents a list of all 2,000 employees in a corporation, a single change is merely a change in $\frac{1}{2000}$ or 0.05% of the dataset. On the other hand, if the dataset 214A represents a list of all 4 employees in an early stage startup company, a single change represents a change in $\frac{1}{4}$ or 25% of the dataset.

It should be appreciated that although the previous examples illustrated magnitude changes based on increasing, decreasing, or otherwise augmenting the size or contents of an existing data component of the dataset 214A (e.g., the number of rows corresponding to the number of employees in a company), changes in magnitude may additionally, or alternatively, include adding data components such as adding an additional column to include, for example, employees' middle initial or their salary.

In some instances, however, a change in magnitude may be with respect to one or more data components but not others. Building off the previous example of a dataset containing employee names, an additional row may be added for new employee "John Doe." In this example, there are no employees in the dataset named "John Doe," and particularly, there are no employees with the first name "John." However, there is an employee in the dataset, "Jane Doe," who shares the same surname. Accordingly, there is an increase in magnitude in the data component associated with the number of rows in the dataset as well as in the data component associated with the number of distinct values in the column for first names, but there is no change in magnitude in the data component associated with the number of distinct values in the column for surname.

Similar to what was discussed above with respect to the magnitude of changes made to the dataset 214A, the frequency by which data change operations occur within a given dataset, or the volatility of the dataset (or its respective data components), may also be noted and/or measured. For example, one or more components of the dataset 214A may be relatively non-volatile while other components experience some measure of volatility. That is, the dataset 214A may not be subject to data change operations on a frequent basis (leading to non-volatile data components), or if the dataset 214A does experience a data change operation, some data components may remain unaffected while others experience some change. In the running example where the dataset 214A represents the names of employees in a company, the company may be nepotistic, only hiring individuals within a given family. Thus, new employees may be added and/or other employees terminated, causing volatility in the data components for the number of rows and/or the number of distinct values in the column for first names, but because the newly added employees and/or the terminated employees all share the same surname, the data component for the number of distinct values in the column for surnames is relatively stable or non-volatile.

The degree of volatility is dependent upon the frequency in which changes are experienced in the data component(s) and does not necessarily reflect the magnitude of those changes. Accordingly, volatility is the result of a comparison of a dataset at a first time point and a second time point, which may be further informed by comparing the dataset at a plurality of time points.

Referring back to FIG. 2, the state(s) of the datasets 214 at any given time point can be stored as one or more snapshots 208, wherein the state(s) will contain any value associated with a predetermined attribute or component of the dataset 214. In some embodiments, a snapshot 208 includes a duplication of all of the datasets 214 where each piece of data within the datasets 214 is frozen or becomes unalterable from its value at the time the snapshot is taken, in essence making snapshot 208 an embodiment of all values of the datasets 214 at a given point in time. In other embodiments, snapshot 208 includes at least a portion or attribute of data from each dataset 214A, 214B . . . 214N, and each portion of data may be the same (e.g., a histogram of the distribution of data values from each of datasets 214A, 214B . . . 214N, the number of rows from each of datasets 214A, 214B . . . 214N, etc.) or it may be different (e.g., the number of rows in the dataset 214A, the most common value of columns in the dataset 214B, etc.). In yet other embodiments, each snapshot 208 represents at least a portion of a data from a single dataset 214A, 214B . . . or 214N.

Database statistics are generated from snapshots 208 and describe at least one database component from one or more of datasets 214A, 214B . . . 214N. One having ordinary skill in the art can appreciate that a data set may have a plurality of statistics and even individual components of the data set such as, for example, a column may have a plurality of statistics. For example, a column may have individual statistics for the most common value of the column, the number of rows in the column, the number of distinct values for the column, a histogram of the distribution of the data values for the column, etc. Statistics generated from datasets 214 may, in some embodiments, be stored in data structures 206.

As depicted in FIG. 2, the computing system 200 includes I/O hardware which may, in some embodiments, be used to communicate with a client device 225 through one or more network connections 220. The I/O hardware 212 may include any input and/or output mechanism described above with reference to FIG. 1.

In one embodiment, a computing system 200 receives a declarative-language-based database command from a client device 225, and a query planner 216 of the computing system 200 determines a plurality of query plans 210 based on the database command, each query plan including a plurality of operations to be performed in a particular sequence to accomplish the same correct result defined by the database command. As the sequence of operations is different between a first query plan 210A and a second query plan 210B, the query planner 216 also calculates a computational cost for each query plan 210A, 210B and may do so by any method known in the art.

Query Planner

In one embodiment, the query planner 216 relies on one or more statistics when calculating the computational cost of the query plans 210A, 210B. The statistics may be generated upon receipt of the database command, or alternatively, statistics may be retrieved from a data structure 206. Generally speaking, statistics based on the most recent snapshot are a more accurate representation of the current state of the datasets 214, and in some embodiments, the query planner 216 relies on the most recent statistics when calculating a predicted computational costs for the query plans 210A, 210B, as known in the art.

Importantly, however, by using statistics to calculate the predicted computational costs of query plans, the query planner is calculating computational costs from a historical perspective—the point in time when the statistics were generated. The datasets from which the statistics were generated may have substantially changed, making any resulting computational cost calculated by a query planner relatively inaccurate with respect to the actual computational cost of a query plan.

In one embodiment of the present disclosure, dynamic weights are applied to the statistics before the computational costs are calculated. The dynamic weights differentially affect the associated statistics and skew the predicted computational costs of query plans accordingly. In one embodiment, the dynamic weights skew the computational costs of query plans proportionally to the volatility of the data components from which the statistics were derived. The volatility of a data component is identified by comparing a plurality of snapshots (or a plurality of statistics) at different times. A dynamic weight is generated based on component volatility and is applied to the associated statistic (e.g., the most recent statistic) to weight its cost at one or more steps in a query plan.

For example, a statistic representing a highly volatile data component may have a dynamic weight applied to it that increases the computational cost of the statistic. In doing so, the dynamic weight makes it costlier to rely on statistics that are out-of-date and that are, therefore, not likely representative of the underlying data. Alternatively, a dynamic weight applied to a statistic generated from a highly volatile data component may decrease the importance of the associated statistic in the computational cost calculation. By decreasing the importance of the volatile statistic, more reliable statistics predominate in the computational cost calculation while the unreliable statistics do not influence the cost calculation.

Referring again to FIG. 2, component volatility is determined by comparing data components and/or statistics from two or more snapshots 208. Based on the volatility, dynamic weights are generated for the components and can be stored in a data structure 206, which may be the same or a different data structure than the data structure representing statistics. In one embodiment, a dynamic weight is generated for a plurality of data components and/or statistics. In other embodiments, a dynamic weight is generated for each data component and/or each statistic. In one embodiment, the query planner 216 applies dynamic weights to the associated statistics to affect their respective computational cost before or while calculating the predicted computational cost for the query plans 210A, 210B. Based on the predicted computational costs, the query optimizer 218 selects the optimal query plan for execution, thereby improving the operation of the computing system when performing queries on a database.

In some embodiments, the query planner 216 and/or the query optimizer 218 are executable components, as that term is understood and described above with reference to computing system 100 of FIG. 1. Additionally, or alternatively, the query planner 216 and/or the query optimizer 218 are individually a combination of executable components and hardware, such as, for example, a combination of executable components and one or more processors or a combination of executable components and one or more FPGAs.

Although depicted in FIG. 2 as separate components, in one embodiment, the query planner and the query optimizer are the same component. Additionally, or alternatively, one or more aspects of the computing system 200 can be distributed to any number of one or more remote systems 222A, 222B . . . 222N. For example, the datasets 214A, 214B . . . 214N may be distributed to remote the systems 222A, 222B . . . 222N, respectively. Additionally, or alternatively, the query planner may be, in some embodiments, distributed to one or more of the remote systems with a database command originating at the client device 225 being transmitted over the network connection(s) 220 to the query planner for compiling; the compiled results (e.g., the set of query plans and their corresponding predicted computational costs) may then be transmitted over the network connection(s) 220 to the query optimizer 218 where an optimal query plan is selected for execution. The foregoing is illustrative of the concept that aspects of the computing system 200, whether physical or functional, may be local to a single computing system or distributed to any of a plurality of remote systems 222A, 222B . . . and/or 222N.

In one embodiment, the dynamic weights generated based on component volatility are "dynamic" in that they include time-dependent functions whose values change relative to how recently corresponding statistics and/or snapshots of the data components were generated. For example, a dynamic weight may impact a statistic less (i.e., the value of the weighted statistic is similar to the value of the unweighted statistic) when the time the statistic and/or the snapshot from which the statistic was derived is temporally close to the time at which the dynamic weight is applied to the statistic. On the other hand, a dynamic weight may impact a statistic more (i.e., the value of the weighted statistic is dissimilar or substantially different than the value of the unweighted statistic) when the time the statistic and/or the snapshot from which the statistic was derived is temporally distant from the time at which the dynamic weight is applied to the statistic.

The time-dependent functions may be linear, exponential, logarithmic, or combinations thereof and may be metered (i.e., the unit of time used to calculate the dynamic weight value in the time-dependent function) in milliseconds, seconds, minutes, hours, days, or any other temporal measurement or combinations thereof. In one embodiment, a first time-dependent function and a second time-dependent function associated with a first dynamic weight and second dynamic weight, respectively, may be metered the same, or alternatively, they may be metered differently. For example, the first time-dependent function may be metered in milliseconds while the second time-dependent function may be metered in hours.

In one embodiment, the dynamic weights are time-dependent functions that represent or otherwise incorporate the volatility of the associated database component into the function. Thus, the volatility of the associated data component may, in some embodiments, affect the degree by which the time-dependent function impacts the statistic. In one embodiment, the time-dependent functions are time-dependent decay functions that are inversely proportional to the volatility of the corresponding data components. Stated another way, as the volatility of a data component increases, the values generated by its corresponding time-dependent decay function decrease. In doing so, a query planner reduces its reliance on volatile data components over time when calculating a predicted computational cost for query plans.

A highly volatile data component may, in some instances, translate to a time-dependent decay function that aggressively impacts the value of the dynamic weight (and thereby the value of the statistic, when applied thereto) with each increased time interval. Alternatively, a stable or relatively non-volatile data component may translate to a time-dependent decay function that insignificantly affects the value of the dynamic weight (and thereby the statistic, when applied thereto) with each increased time interval. Thus, the dynamic weight—portrayed in the foregoing as a time-dependent decay function—adjusts the value of a corresponding statistic as the statistic becomes out-of-date and non-representative of the underlying data. When a statistic represents a volatile data component, its value decreases more quickly than if the statistic represents a stable data component.

As described above, query planners rely on statistics when calculating computational costs of query plans. By applying the dynamic weights to the statistics, the statistics are able to change in a time-dependent fashion, thereby augmenting the statistics to differentially affect the predicted computational cost of query plans over time. In some embodiments, a dynamic weight generated from a highly volatile data component may render the associated statistic unreliable (e.g., by making it too computationally expensive or by reducing its contribution to the predicted computational cost to a negligible value, as described above) within seconds of the statistic being generated. In other embodiments, the dynamic weight may render the associated statistic unreliable within minutes, hours, or days. In yet other embodiments, the dynamic weight may be based on a stable or relatively non-volatile data component and fails to render the associated statistic unreliable, even after several days or even months after the associated statistic was generated.

In one embodiment, the dynamic weight is a time-dependent decay function that is inversely proportional to the volatility of the associated data component and may automatically and differentially affect the computational cost of query plans based on the amount of elapsed time since the query planner applied the dynamic weight to a corresponding statistic. As a particular example, the time-dependent decay function may be represented by the following equation:

$$y(t)=y(0) \cdot e^{kt},$$

where y(0) is an initial value of the dynamic weight, e is the mathematical constant (i.e., the base of the natural logarithm), k is a specified constant, and t is the amount of elapsed time whereby t={t 531 $\mathbb{R}$ :t≥0}.

In one embodiment, y(0) is the numerical value of the most recent statistic.

In one embodiment, k is a measure—provided as a numerical value—of the volatility of the data component. Additionally, or alternatively, k may be equal to the negative absolute value of component volatility, where component volatility is provided as a numerical value. In one or more embodiments where k is equal to the negative absolute value of component volatility, the function results in decreasing values as time increases. Such embodiments are useful in the present invention to, for example, decrease the value of a statistic associated with a volatile data component as the statistic becomes stale or out-of-date such that computational costs incorporating the statistic are affected accordingly.

In some embodiments, the time-dependent function may be any simple or complex function modeling the volatility of a data component. This includes, for example, time-dependent decay functions that results in decreasing dynamic weight values over time. However, other types of functions may be generated to model the volatility of data components. In some embodiments, the time-dependent function modeling the volatility of a data component may be any combination of one or more functions. For example, a time-dependent function may be a linear function (e.g., $y=mx+b$), a quadratic function (e.g., $y=ax^2+bx+c$), a power function (e.g., $y=ax^b$), a polynomial function (e.g., $y=a_n \cdot x^n + a_{n-1} \cdot x^{n-1} + \ldots + a_2 \cdot x^2 + a_1 \cdot x^1 + a_0$), a rational function (e.g., a ratio of two polynomials), an exponential function (e.g., $y=ab^x$), a logarithmic function (e.g., $y=a\ln(x)+b$), a sinusoidal function (e.g., $y=a\sin(bx+c)$), or combinations thereof.

In some embodiments, any of the aforementioned time-dependent functions may be generated from the two most recent snapshots of a data component. In one embodiment, more than two snapshots are used to generate a time-dependent function. For example, a moving window may be used to capture the most recent five snapshots of a given data component, and the time-dependent function is modeled based on the volatility observed within the most recent five snapshots. It should be appreciated that such a moving window may capture any number of snapshots, whether user-defined or automatically determined by a computing system, and may capture a different number of snapshots for different data components. In one or more embodiments, statistics may be used in addition to or instead of snapshots.

Additionally, or alternatively, a historical trend or a repeating trend in data component volatility may be modeled by a time-dependent function to generate cyclical and/or predictive weighting of database statistics. For example, a data component may vacillate between a volatile state and a non-volatile state in a time-dependent manner, and a time-dependent function may decrease and increase the weight of an associated statistic to comport with the predicted states of volatility. As a particular, non-limit example, a database may represent the inventory for a clothing retailer, and every winter season, a data component for the number of rows in a "winter clothing" column becomes highly volatile, whereas this same data component is relatively stable in the summer season. The change in volatility may be, for example, related to the number and types of winter clothes carried and sold by the retailer in the winter season (e.g., many and varied) versus the summer season (e.g., few and consistent). A function representing the volatility of the number of rows in the "winter clothing" column may generate a dynamic weight that slowly decays an associated statistic, if at all, during the summer season, but the function may generate a dynamic weight that more rapidly decays the associated statistic as the winter season approaches in an attempt to predict the historically highly volatile nature of this data component during this time period. The function may also generate a dynamic weight that increases the value of an associated statistic back to (or substantially close to) its value when the winter season ends, when the summer season begins, or at some transition point there between, so the non-volatile nature of the summer season on this particular data component is reflected in the dynamic weight and/or the associated statistic.

In general, a larger number of snapshots and/or a number of snapshots over a longer period of time may produce a more robust model of component volatility and/or take into account global changes in component volatility. On the other hand, using a smaller number of snapshots and/or a number of snapshots over a shorter period of time may produce a model that is sensitive to recent changes in component volatility. Either type of model may be used to generate a time-dependent function for one or more data components and may be selected by a user or predetermined by the computing system.

Figures 3, 4:
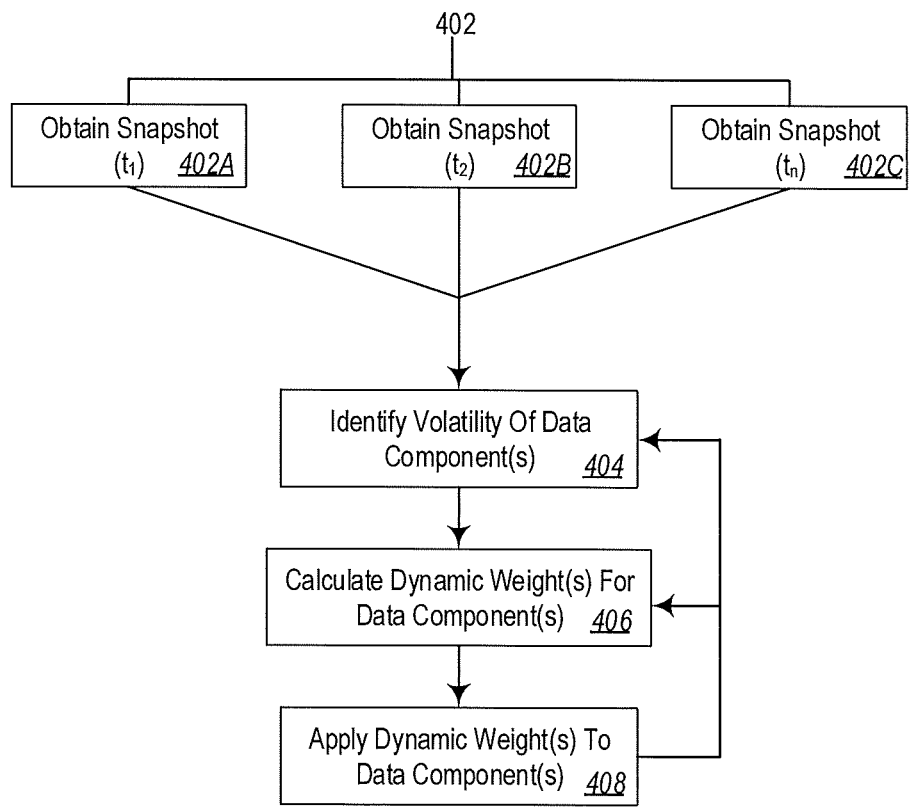
FIG. 3 illustrates a table of components from an exemplary dataset together with respective time-dependent dynamic weights, according to one or more embodiments of the present disclosure.
FIG. 4 illustrates a flowchart with various acts that can be implemented by a computing system for weighting data components based on volatility, according to one or more implementations of the present disclosure.

Referring now to FIG. 3, illustrated is a table 300. Recited in the first column of the table 300 are exemplary names of various database statistics corresponding to one or more data components. Each recited statistic is associated with a dynamic weight, the value of which being generated from a time-dependent function and provided in the appended columns at a first time ($t_1$), at a second time ($t_2$), and at a time subsequent to the second time ($t_n$). As is clearly portrayed in FIG. 3, the value of each dynamic weight is affected in a time-dependent fashion and each dynamic weight is affected at a different rate.

In one or more embodiments, and as provided herein, the dynamic weights are based on the volatility of a corresponding data component. Referring to the table 300 of FIG. 3, volatility of data components may be inferred from the values of associated dynamic weights over time—more volatile data components generate dynamic weights that decay more quickly over time and less volatile data components generate dynamic weights that decay more slowly over time. For example, the value of the dynamic weight for database statistic "statistic_col1" at $t_1$ is 0.562, which drops dramatically to 0.053 at $t_2$ and to 0.001 at $t_n$. The value of the dynamic weight for database statistic "statistic_col8" at $t_1$ is 1, and it slightly depreciates to 0.999 at $t_2$ with a value of 0.985 at $t_n$. An inference may be drawn by comparing these values. One such inference may be that the data component associated with database statistic "statistic_col1" is more volatile than the data component associated with database statistic "statistic_col8" because the value of the weight associated with statistic_col1 decayed more quickly compared to the value of the weight associated with statistic_col8. In one embodiment, the dynamic weights associated with database statistics "statistic_col1" and "statistic_col8" are time-dependent exponential decay functions.

Also depicted in FIG. 3, the rate of decay may vary over time. For example, the weight for database statistic "statistic_col5" demonstrated a slow decay rate between $t_1$ and $t_2$ (i.e., a 0.001 decrease in value from 0.890 to 0.889), but the rate of decay seemingly increased over time such that the value of the weight at $t_n$ was equal to 0.25. In one embodiment, the dynamic weight associated with database statistic "statistic_col5" is a time dependent rational function having an asymptote at 0.25.

Also depicted in FIG. 3, the rate of decay may fluctuate over time. For example, the weight for database statistic "statistic_col7" of table 300 shows an initial increase in the value of the weight between $t_1$ and $t_2$ (i.e., a 0.001 increase in value from 0.958 to 0.959) with an eventual decrease in the value to 0.85 by time $t_n$. Such fluctuations in dynamic weight value over time may be the result of historical trends. In one embodiment, the dynamic weight associated with database statistic "statistic_col7" is a time-dependent polynomial function. In another embodiment, the dynamic weight associated with database statistic "statistic_col7" is a time-dependent sinusoidal function.

In some embodiments, the dynamic weight may be modeled as a growth function where the value of the dynamic weight increases over time rather than decreasing over time. This may, in some embodiments, act to increase the importance and/or relevance of the associated statistic in a predicted computational cost rather than acting to deemphasize it or decrease its relevance. It may be advantageous under certain circumstances to increase, rather than decrease, the computational cost of a statistic in a cost calculation, as it may act to increase the efficiency of selecting efficient query plans due to an increased reliance on more non-volatile data components.

In some embodiments, and as depicted in FIG. 3, the value of dynamic weights is less than or equal to one. This may, in one embodiment, allow the dynamic weight to be a scaling factor to the associated statistic such that when the dynamic weight is applied to the statistic, any computational cost derived therefrom is influenced by the relative degree of volatility of the underlying data component.

Methods for Dynamically Modifying Query Plan Costs

Figure 5:
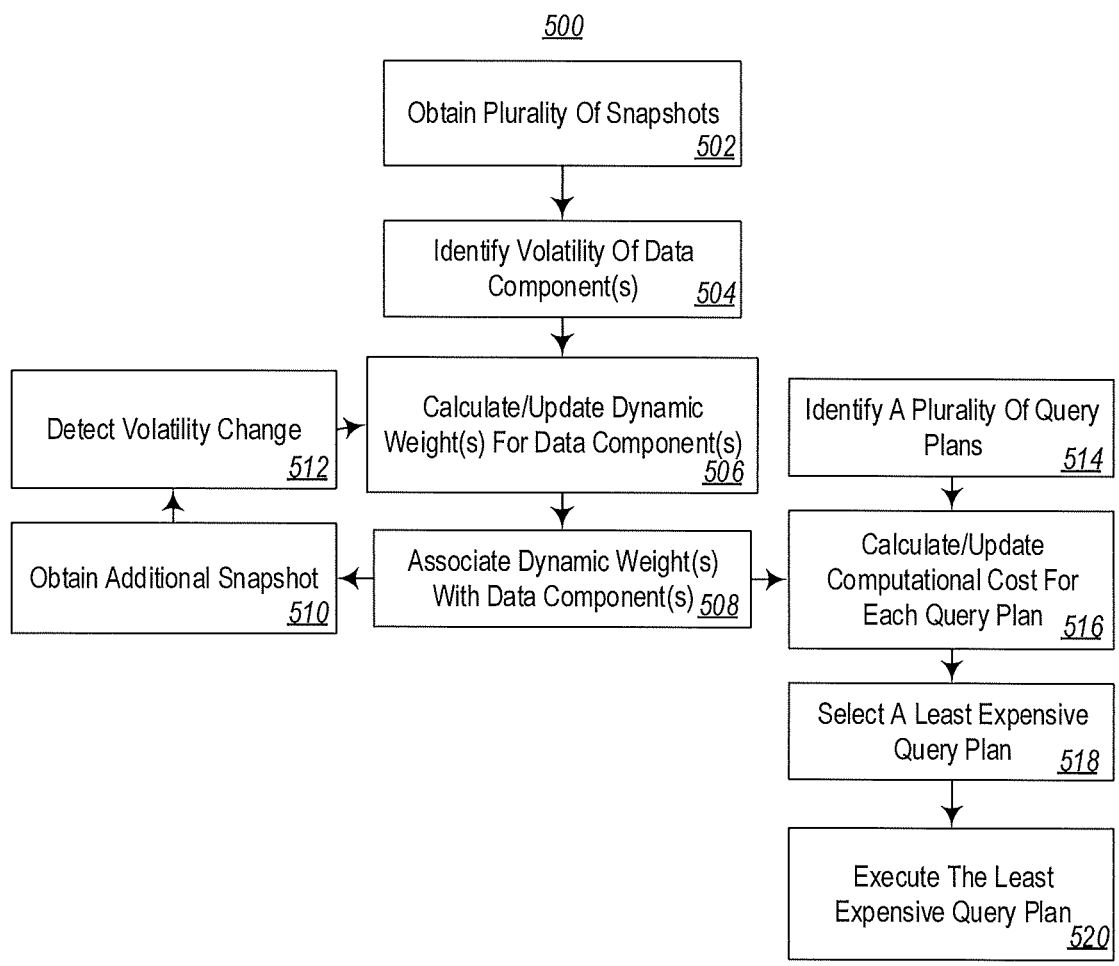
FIG. 5 illustrates a flowchart with various acts that can be implemented by a computing system for selecting a least expensive query plan based on the computational cost of the query plans, according to one or more implementations of the present disclosure.

FIGS. 1 and 2 and the corresponding text illustrate or otherwise describe one or more systems, components, modules, mechanisms and/or graphical user interfaces related to modifying weighting of database components based on component volatility. One will appreciate that embodiments of the present invention can also be described in terms of methods comprising one or more acts for accomplishing a particular result. The methods may be implemented by a computer system including one or more processors executing computer-executable instructions stored on computer-readable media such as computer memory. In particular, the computer memory may store computer-executable instructions that when executed by one or more processors cause various functions to be performed, such as the acts recited in the embodiments. For example, FIGS. 4 and 5, with the corresponding text, illustrate or otherwise describe a sequence of acts in methods for modifying weighting of database components based on component volatility. The acts of FIGS. 4 and 5 are described below with reference to the components and modules illustrated in FIGS. 1 and 2, where appropriate. Although the method acts may be discussed in a certain order or illustrated in a flowchart as occurring in a particular order, no particular ordering is required unless specifically stated, or required because an act is dependent on another act being completed prior to the act being performed.

FIG. 4 illustrates a flow chart of an example computer-implemented method 400 for modifying the weighting of database components based on component volatility. The method 400 will be described with respect to one or more of FIGS. 1-2 discussed previously. This method includes a plurality of acts that are performed by the computing system that generates the dynamic weights to be applied to the corresponding database components. This computing system may be referred to herein as a database server. An example of a database server or other similar computing system for implementing method 400 of FIG. 4 includes the computing system 200 of FIG. 2 and, more generally, embodiments of the computing system 100 of FIG. 1.

The database server includes at least one hardware processor 102, 202 configured to execute computer-executable instructions and computer-readable storage media for storing computer-executable instructions and/or data structures (e.g., memory 104 of computing system 100 or system memory comprising volatile and/or non-volatile memory of the computing system 200).

The method 400 includes obtaining a plurality of snapshots of one or more datasets, the one or more datasets comprising one or more data components (act 402). For example, a computer-executable component 106 of computing system 100 may comprise computer-executable instructions that when executed by processor 102 obtain a plurality of snapshots of one or more datasets (act 402). The one or more datasets may, for example, be stored in memory 104. The computer-executable instructions for obtaining snapshots may, in some implementations, be configured to obtain snapshots periodically according to a predefined schedule, or may, in some implementations, be dynamically in response to a user input received at user interface 112.

Additionally, or alternatively, one or more datasets 214A, 214B . . . 214N may be stored within database 204 of computing system 200, the database 200 being stored within the volatile and/or non-volatile system memory of computing system 200. Query planner 216 may include computer-executable instructions that when executed by processor 202 obtain a plurality of snapshots 402A, 402B . . . 402N of one or more datasets 214A, 214B . . . and/or 214N (act 402). The computer-executable instructions for obtaining snapshots may, in some implementations, be periodically scheduled, as provided by the computer-executable instructions, or may, in some implementations, be in response to a user input received from client device 225 by I/O hardware 212 using network communications 225.

The disclosed methods also include identifying a volatility of each of the one or more data components from the plurality of snapshots (act 404). For example, a computer-executable component 106 of computing system 100 may comprise computer-executable instructions that when executed by processor 102 identifies a volatility of each of the one or more data components from the plurality of snapshots (act 404). The volatility of data component may be identified as described above, which includes, for example, identifying the frequency of changes affecting each data component between the plurality of snapshots. As a particular example, volatility may be identified by calculating a mode or median of a histogram representing the distribution of data values in a column and tracking shifts in the calculated mode or median between snapshots. The foregoing functionality may, for example, result from processor 102 executing computer-executable instructions of computer-executable component 106.

Additionally, or alternatively, identifying a volatility of each of the one or more data components from the plurality of snapshots (act 404) may be carried out by query planner 216 of computing system 200 using one or more processors 202.

The disclosed methods also include generating a plurality of different dynamic weights based on the data component volatility, the plurality of different dynamic weights including a separate dynamic weight for each of the one or more data components (act 406). For example, a computer-executable component 106 of computing system 100 may comprise computer-executable instructions that when executed by processor 102 generates a plurality of different dynamic weights based on the data component volatility (act 406). Additionally, or alternatively, generating a plurality of different dynamic weights based on the data component volatility (act 406) may be carried out by query planner 216 using one or more processors 202.

In one embodiment, the generated weights are stored in a data structure 206 of database 204 for later reference, updating, and/or application to data components. In some implementations, method 400 includes applying the different dynamic weights to the one or more data components (act 408). This may, for example, be carried out by query planner 216 of system 200 or by a computer-executable component 106 of computing system 100 configured to apply the different dynamic weights to the one or more data components (act 408) when executed by one or more processors 102.

Attention will now be directed to FIG. 5, which illustrates a flowchart 500 of acts associated with similar methods for applying weights to data components and for executing query plans. As illustrated, the disclosed methods include obtaining a plurality of snapshots (act 502), identifying the volatility of data components (act 504), and associating dynamic weights with data components (act 508), which in some implementations may be substantially similar to acts described above in method 400 and may be implemented in substantially the same manner.

The disclosed methods also include calculating/updating the dynamic weights for data components (act 506), which in one implementation is substantially similar to generating a plurality of different dynamic weights based on the data component volatility, the plurality of different dynamic weights including a separate dynamic weight for each of the one or more data components (act 406) described above.

In some instances, the updating the dynamic weights for data components (act 506) is performed in response to obtaining additional snapshots of one or more datasets (act 510) and detecting a volatility change of data components in the one or more datasets (act 512). The obtaining additional snapshots of one or more datasets (act 510) and detecting a volatility change of data components in the one or more datasets (act 512) may be also be accomplished to update existing dynamic weights rather than establishing dynamic weights de novo. Accordingly, updating dynamic weights for data components (act 506) may, in some implementations, require significantly less processing times and/or resource utilization than corresponding method act 406.

The disclosed methods also include identifying a plurality of query plans (act 514). For example, a computer-executable component 106 of computing system 100 may comprise computer-executable instructions that when executed by processor 102 identify a plurality of query plans (act 514). Additionally, or alternatively, query planner 216 may identify a plurality of query plans (act 514). Particularly, query planner may receive a database command (e.g., a database query) from client device 225 through network communication 220, the database command including a declarative-language-based command (e.g., an SQL-based database command). In one embodiment, query planner 216 includes a parser for parsing the database command to a set of operations for fulfilling the database command. Using the set of operations, the query planner 216 then identifies all or a subset of query plans that, when executed by the database server, accomplish the same, correct result indicated by the database command.

After the query plans are identified (act 514), a computational cost for each of the plurality of query plans is calculated based on dynamic weights associated with the data components (act 516). For example, a computer-executable component 106 of computing system 100 may comprise computer-executable instructions that when executed by processor 102 calculate a computational cost for each of the plurality of query plans based on dynamic weights associated with the data components (act 516). Additionally, or alternatively, calculating a computational cost for each of the plurality of query plans based on dynamic weights associated with the data components (act 516) may be carried out by query planner 216 using one or more processors 202. In one embodiment, and as described above, the dynamic weights are time-dependent functions based on the volatility of the data components.

Next, a least computationally expensive query plan is selected from the plurality of query plans (act 518). For example, a computer-executable component 106 of computing system 100 may comprise computer-executable instructions that when executed by processor 102 select a least computationally expensive query plan (act 518).

Additionally, or alternatively, selecting a least computationally expensive query plan (act 518) may be carried out by query optimizer 218 using one or more processors 202. As described above, the query optimizer may include a computer-executable component that, in some embodiments, is combined with one or more hardware components, such as, for example, a processor 202 or a FPGA. The least computationally expensive query plan selected by the query optimizer 218 may, in some embodiments, be the optimal query plan as defined by computing systems 200 and/or as defined by an administrator of database 204.

Finally, the least expensive query plan may be executed (act 520). For example, processors 102 may execute the least expensive query plan (act 520) at computing system 100. Additionally, or alternatively, processor 202 may execute the least expensive query plan (act 520) at computing system 200, which may, in some embodiments, result in changes to one or more datasets 214. In some embodiments, changes to datasets 214 may trigger identification and/or tracking of changes made to one or more data components and may further schedule execution of acts 510, 512, 506, 508, 516, or combinations thereof.

Example Implementations

Attention will now be given to FIGS. 6A and 6B, which represent an exemplary embodiments of the systems and methods previously described to provide additional detail and clarity to the foregoing description by way of example. The exemplary embodiments of FIGS. 6A and 6B, and the associated text, are non-limiting examples that are merely provided to illustrate one or more aspects of the systems and methods previously described and, therefore, are not meant to limit the scope of the disclosure or the appended claims.

Referring particularly to FIG. 6A, a database 600 is illustrated. The database 600 stores information related to the inventory of a sports equipment retailer. For example, the database 600 is illustrated as including three datasets: dataset 1 (610), dataset 2 (620), and dataset 3 (630). Dataset 1 (610) discloses the name and location for each member in the retailer's supply chain. Dataset 2 (620) discloses the contents of the most recent shipment invoice; the shipment invoice includes the kind of item received, the number of those items received, and the price paid for each item.

Dataset 3 (630) discloses the current inventory for the store and includes the kind of item for sale, the number of those items in stock, and the sale price for each item.

In one embodiment, a user of the database 600 may submit a database query to, for example, report on the total number of basketballs in stock and from what country the basketballs were purchased. Alternatively, a user may submit a database query to determine the profit margin for the two most prevalent inventory items. Regardless of the database query considered, a query planner associated with the database 600 will parse the database query to determine a set of operations required to provide the requested information and will also identify a number of query plans that when executed will provide the same, correct result. The query planner also calculates a predicted cost for executing each query plan.

For example, with respect to the database query about determining the profit margin for the two most prevalent inventory items, a query planner may determine that a first query plan includes joining dataset 2 (620) and dataset 3 (630) followed by determining the highest two values in the # column of the newly formed table, and finally calculating the difference between a purchase price and a sales price to determine the profit margin.

The query planner may also determine a second query plan, which includes determining the profit margin for each item listed in dataset 2 (620) and dataset 3 (630) followed by joining dataset 2 (620) and dataset 3 (630) and finishing up with selecting the two highest two values in the # column of the newly formed table.

The query planner may additionally determine a third query plan, which includes determining the two highest values in the # column for dataset 3 (630) followed by a scan of items in dataset 2 (620) that match an item in dataset 3 (630). If the scan positively identifies an item from dataset 2 (620) that is also within dataset 3 (630), the associated value in the # column from dataset 2 (620) will be joined with the associated value in the # column from dataset 3 (630). The new value will then be compared to the previously determined highest values, and the two highest values will be retained. Once the two highest values have been finally determined, the purchase price and sale price of the two items will be compared to determine the profit margin.

As demonstrated above, there are a wide variety of ordered operations that can be used to arrive at the same, correct result for a database query. The query planner can determine which of the query plans is most optimal by calculating a cost for each query plan, and as described in the present disclosure, the costs may be modified by dynamic weights associated with each data component, the dynamic weights incorporating the volatility of each data component therein. Although FIG. 6A illustrates a single snapshot, the volatility of various data components may be generally inferred.

For example, it is likely that almost any data component associated with dataset 1 (610) will be relatively non-volatile, as the retailer is unlikely to change suppliers and the suppliers are unlikely to undergo a name change or change the country from where they conduct business. Accordingly, any time-based dynamic weight applied to statistics for data components associated with dataset 1 (610) will likely not depreciate the statistical value to a significant degree over time.

As a further example, it is likely that many data components associated with dataset 2 (620) will be relatively volatile, as the number of items being shipped (e.g., the number of rows in the "Item" column) or the number of each item shipped (e.g., the distribution of values in the # column) will vary greatly depending on the order. Accordingly, any time-based dynamic weight applied to statistics for data components associated with dataset 2 (620) will likely depreciate the statistical value to a significant degree over time.

As a further example, data components associated with dataset 3 (630) are likely to vary in volatility, depending on what data component is considered. For example, a histogram of the distribution of data values from the # column is likely to be very volatile because the values change with each sale. However, the number of rows in the item column is not likely to experience as much volatility assuming the store is reluctant to add new items to its inventory. Accordingly, any time-based dynamic weights applied to statistics for data components associated with dataset 3 (630) will likely have a varying degree of depreciation on the applied statistics over time.

Thus, when computing a computational cost for the aforementioned query plans, the volatility of each data component will affect the query planner's reliance thereon, particularly as time elapses since the statistics were generated.

Referring now to FIG. 6B, listed are the computational costs associated with the three exemplary query plans illustrated above for determining the profit margin for the store's two most prevalent inventory items. The computational cost for the first query plan is lowest at a first time point followed by the second query plan and the third query plan. However, as time elapses, the computational cost of query plan 1 becomes more expensive than the computational cost of query plan 2. This suggests that the dynamic weights associated with the relevant statistics in query plan 1 are degrading more rapidly than the relevant statistics of query plan 2. That is to say that at least some of the data components relied on in query plan 1 are more volatile than data components relied on in query plan 2. This may also suggest that at $time_2$ the actual cost of query plan 1 may be more than the actual cost of query plan 2, and if the original predicted costs were used to choose a query plan at $time_2$, the executed query plan would likely not have been the optimal plan.

As time continues to elapse and the computational cost of exemplary query plans 1-3 are calculated, query plan 1 remains the second most computationally expensive query plan, but query plan 3 has jumped to the most optimal plan and query plan 2 is now the most computationally expensive plan of the three. This combination of events may occur for any number of reasons. For example, the dynamic weights associated with data components in query plan 1 may have degraded quickly but stabilized at an asymptotic value, whereas the dynamic weights associated with the data components of query plan 2 may have degraded slowly at first with an increased rate of decay as more time elapsed. As to query plan 3, the statistical values associate with query plans 1 and 2 may have started at higher initial values compared to the initial value of query plan 3, but the dynamic weights associated with the data components of query plan 3 may have been relatively stable, allowing the computational cost of query plan 3 to be relatively static (or very slowly depreciating) over time.

The example embodiments of FIGS. 6A and 6B illustrate the differential effects of dynamic weights on statistics that are associated with volatile and non-volatile data components, and particularly illustrated how dynamic weights can affect the computational cost of query plans over time.

Technical advantages of the embodiments and implementations of the present invention should be apparent and are found throughout the disclosure. Nonetheless, some additional and/or reiterated advantages are set forth below, which are not intended to limit the scope of the disclosed embodiments or to be an exhaustive enumeration of every advantage of the present invention. It should be appreciated that some advantages, whether or not specifically enumerated, are inherent to implementations of the present invention and can be observed by practicing one or more embodiments thereof.

Implementations of the present disclosure provide improvements to the operation of computing systems, particularly with respect to improvements to the operation of database servers. For example, one advantage/improvement provided by implementations of the present disclosure includes an increased efficiency at selecting and executing optimal query plans.

Query planners associated with database servers rely on database statistics to predict the computational costs of various query plans. When those statistics become stale or out-of-date, the query planner becomes inefficient by selecting query plans that are actually the least computationally expensive query plan. As a particular, non-limiting example of this, a query optimizer may have to determine whether an index seek operator (which retrieves selective rows from a table) is a more optimal choice than an index scan operator (which retrieving all rows from a table) at a given step within a query plan. Based on the available statistics, the predicted cost of utilizing the index scan operator is determined to be less than or equal to the predicted cost of using the index seek operator. However, the data component associated with this statistic has substantially changed since the statistic was last updated, rendering the statistic out-of-date and not reflective of the actual cost of utilizing the index scan operator, which is now far greater than the cost of using the index seek operator. As a result, if the query optimizer chooses a query plan that favors the index scan operator over the index seek operator, the actual computational cost of executing that query plan would be significantly greater than the actual computational cost of executing a query plan incorporating the index seek operator.

As demonstrated by the foregoing example, when a data component changes in a way that the associated statistic is no longer representative of that data component, the computational costs—and thereby the optimal query plan—is impacted, making the query optimizer inefficient at choosing an optimal query plan. By applying differential and dynamic weights to data components, embodiments of the present disclosure enable the query optimizer to more efficiently choose an optimal query plan despite the passage of time and accompanying changes in underlying data distributions.

By implementing embodiments of the present disclosure, the resource intensive operation of updating statistics may be delayed and/or done less frequently. This is, in part, because the query planner incorporates the volatility of data components into the cost calculation in the form of dynamic weights. In doing so, query plans that rely on statistics that are representative of volatile data components (and thereby statistics that are not likely to accurately represent the state of the underlying data) can be avoided or are at the very least weighted according to their respective volatility to, for example, reduce their impact on predicted computational costs. This favors execution of query plans that rely less on volatile statistics in their overall predicted computational cost and consequently increases the likelihood that query plans selected for execution are more likely to be computationally less expensive than unweighted alternatives. Thus, by weighting statistics as disclosed herein, statistics can be used more efficiently for longer periods of time, allowing them to be updated less frequently. Updating statistics less frequently in a given period of time frees up additional processing cycles and/or other computational resources that can be used to process additional database queries, or which may be dedicated to other processes, thereby increasing the efficiency of the computing system, itself.

In some embodiments, modifying statistics with the disclosed weights tempers the statistics so that they more accurately portray the reliability of underlying data. This may be used to inform what statistics need to be updated and at what intervals, thereby also increasing the efficiency of the computing system. Instead of guessing or randomly updating statistics, statistics may be updated selectively, and by reducing the number and/or frequency of updates, the database server will experience a net increase in the number of processing cycles and/or an overall decrease in resource utilization. Accordingly, the database server may use the additional resources to serve a larger number of clients, or alternatively, the computing requirements for the database server may be reduced.

Further, embodiments of the present disclosure reduce the amount of oversight by network administrators. In some embodiments, if a query optimizer routinely fails to select an optimal query plan following an update of the database statistics, it is likely that an extremely volatile statistic is skewing predicted computational costs towards inefficient query plans. Typically, an administrator would be required to troubleshoot the problem and manually identify the offending statistic(s) followed by limiting and/or eliminating the statistics from the computational cost analysis. This process can severely hamper the productivity of a database server. Practicing embodiments of the present disclosure reduces the likelihood that volatile statistics will skew predicted computational results towards inefficient query plans because the associated dynamic weight will automatically reduce the statistic's importance and/or the query planner's reliance thereon during computational cost analyses. This reduces the need for administrators' intervention and significantly increases the productivity of a database server.

Additionally, by incorporating the volatility of data components into the dynamic weight affecting their corresponding statistic, changes to the data components may be tracked and appropriately assimilated into cost calculations in a predictive manner—without actually updating the statistics. This allows for a predicted, but more accurate, real-time view of the state of the database beyond what is available from the most recent snapshots. This predictive power may allow administrators to more accurately predict future needs and/or preemptively eliminate potential bottlenecks or other inefficiencies that could arise from future database conditions.

Abbreviated List of Defined Terms

To assist in understanding the scope and content of the foregoing written description and appended claims, a select few terms are defined directly below.

The term "database component" or "data component" as used herein may be used to describe a structural component of a dataset, database, or index such as, for example, a row and/or a column. The term "database component" or "data component" may also be used herein to describe other descriptive aspects of datasets, databases or indexes such as, for example, the number of rows, the number of distinct values for a column, histograms of the of the distribution of data values in a column, the number of distinct index keys, and/or the most common value(s) in a column. It should be understood that reference to "rows" and "columns," unless specifically stated otherwise can also include their transformed counterparts. That is, through a simple transformation, rows may become columns and vice versa. As an exemplary illustration, the term "database component" or "data component" also includes the number of distinct values for a row, as the row may be transformed into columnar format and satisfy the present definition as encompassing "the number of distinct values for a column."

As used herein, the term "database statistic" or "statistic" is used to describe a snapshot of any database component at a given time. For example, a first database component may represent the most common value of a column. A snapshot of the first database component at time n yields a database statistic that describes the most common value of the column at time n.

As used herein, the term "database server" is broadly defined as any general purpose or special purpose computer that stores one or more databases and which supports (e.g., compiles and executes commands) one or more database languages known in the art (e.g., SQL, Datalog, Data Mining Extensions (DMX), Language Integrated Query (LINQ), XML Query (XQuery), etc.). A database server may be local or may be distributed and may be accessed through a network(s).

As used herein, the term "query planner" is a module of a computing system in communication with a processor (or it can, itself, be a processor) that is configured to determine all or a subset of available query plans that when executed produce the same, correct result for a database command. A query planner may be further configured to predict computational costs for each alternative query plan. This can include analyzing each alternative query plan and predicting the computational cost of executing the database command according to each alternative query plan. As described above, the query planner may additionally apply one or more dynamic weights to data components (e.g., statistics) and may, when making the cost prediction, incorporate the dynamic weight into the cost prediction of each alternative query plan. An administrator may adjust properties of the query planner, for example, to exclude or manually adjust dynamic weights in the cost prediction or to add additional weighting factors to the cost prediction (e.g., to favor decreased resource utilization, even at the expense of processing time). It will be appreciated that predicting computational costs includes any method known in the art and specifically includes calculating computational costs using a predefined or user-defined formula.

The term "query optimizer" is a module of a computing system in communication with a processor (or it can, itself, be a processor) that is configured to select an optimal query plan to be executed based on a predicted computational cost for the optimal query plan. The query optimizer may be a separate component or module from the query planner, or the query optimizer may represent additional functionality of the query planner, itself. Therefore, when used herein, the term "query optimizer" refers generally to the particular functionality of selecting an optimal query plan, which may be carried out by separate components or modules of a computing system (local or distributed) or may be carried out by the same component or module (e.g., the query planner).

As used herein, the term "snapshot" represents a time-dependent identification of the state of one or more datasets and/or data components associated with a dataset. A snapshot is intended to include a duplication of all of the datasets at a given point in time and may freeze or otherwise render the duplicated data unalterable from the time the snapshot is taken to, in some embodiments provide a record of all values of the datasets at a given point in time. A snapshot may also include a record of only a portion of data from one or more dataset. Snapshots may record the same portion of one or more datasets (e.g., a histogram of the distribution of data values for each datasets, the number of rows for each dataset, etc.), or snapshots may record different portions within different datasets (e.g., the number of rows are recorded for a first dataset and/or a first column in a dataset, the most common value of columns are recorded from a second dataset and/or column within a dataset, etc.).

The term "user" as used herein encompasses database users and database administrators and does not, unless otherwise specified, differentiate between a database user and a database administrator as users. Accordingly, any step performed by a "user" or "administrator" may be performed by either or both a user and/or an administrator. Additionally, or alternatively, any steps performed and/or commands provided by a user may also be performed/provided by a database application programmed by a user.

Unless defined otherwise, all technical and scientific terms used herein have the same meaning as commonly understood by one of ordinary skill in the art to which the present disclosure pertains.

Various aspects of the present disclosure, including devices, systems, and methods may be illustrated with reference to one or more embodiments or implementations, which are exemplary in nature. As used herein, the term "exemplary" means "serving as an example, instance, or illustration," and should not necessarily be construed as preferred or advantageous over other embodiments disclosed herein. In addition, reference to an "implementation" of the present disclosure or invention includes a specific reference to one or more embodiments thereof, and vice versa, and is intended to provide illustrative examples without limiting the scope of the invention, which is indicated by the appended claims rather than by the following description.

The present disclosure may be embodied in other specific forms without departing from its spirit or essential characteristics. The described embodiments are to be considered in all respects only as illustrative and not restrictive. The scope of the invention is, therefore, indicated by the appended claims rather than by the foregoing description. While certain embodiments and details have been included herein and in the attached disclosure for purposes of illustrating embodiments of the present disclosure, it will be apparent to those skilled in the art that various changes in the methods, products, devices, and apparatus disclosed herein may be made without departing from the scope of the disclosure or of the invention, which is defined in the appended claims. All changes which come within the meaning and range of equivalency of the claims are to be embraced within their scope.

What is claimed is:

1. A computer system comprising:
   one or more processors; and
   one or more computer-readable hardware storage media having stored thereon computer-executable instructions that are executable by the one or more processors to cause the computer system to modify weighting of database components based on component volatility by causing the computer system to perform at least the following:
   obtain a plurality of snapshots of one or more datasets, the one or more datasets comprising one or more data components;

identify a volatility for at least one data component of the one or more data components from the plurality of snapshots;

based on the volatility, generate a dynamic weight for the at least one data component, wherein the dynamic weight for the at least one data component comprises a time-dependent function that is proportional to the volatility of the at least one data component, and wherein the dynamic weight changes relative to temporal distance from when one or more of the snapshots, or statistics generated from the plurality of snapshots were generated; and apply the dynamic weight for the at least one data component, for computation of cost prediction, to the at least one data component.

2. The system as in claim 1, wherein the computer system further includes computer executable instructions that are executable to cause the computer system to perform the following:

obtain an additional snapshot of the one or more datasets;

detect a volatility change of a first data component of the one or more data components;

based on the volatility change, calculate an updated dynamic weight for the first data component; and provide the updated dynamic weight to a query planner which utilizes the updated dynamic weight to calculate a computational cost for each of a plurality of different query plans.

3. The system as in claim 1, wherein the computer system further includes computer executable instructions that are executable to cause the computer system to perform the following:

identify a plurality of query plans comprising the at least one data component of the one or more data components in the one or more datasets;

calculate a computational cost for each of the plurality of query plans based at least on the dynamic weight associated with the at least one data component; and initiate a selection by a query optimizer of a least computationally expensive query plan from the plurality of query plans.

4. The system as in claim 3, wherein the computer system further includes computer executable instructions that are executable to cause the computer system to perform the following:

obtain an additional snapshot of the one or more datasets;

detect a volatility change of the at least one data component;

based on the volatility change, calculate an updated dynamic weight for the at least one data component; and recalculate the computational cost for each of the plurality of query plans based at least in part on the updated dynamic weight associated with the at least one data component.

5. The system as in claim 3, wherein the dynamic weight that comprises the time-dependent function that is proportional to the volatility of the at least one data component comprises a time-dependent function that is inversely proportional to the volatility of the at least one data component.

6. The system as in claim 5, wherein the time-dependent decay function comprises:

a first value expressed at a first time point, wherein the first value is less than or equal to one; and a second value expressed at a second time point, wherein the second value is less than the first value and wherein the second time point occurs temporally after the first time point.

7. The system as in claim 5, wherein the dynamic weight automatically updates and differentially affects the computational cost for each of the plurality of query plans based upon an amount of elapsed time since the query planner applied the dynamic weight, wherein the dynamic weight at any given time, referenced by y(t), is equal to a product of y(0) and $e^{kt}$, wherein y(0) is an initial value of the dynamic weight, wherein e is the mathematical constant that is a base of the natural logarithm, wherein k is a specified constant, and wherein t is the amount of elapsed time.

8. The system as in claim 7, wherein the specified constant k is a negative absolute value of the volatility of the at least one data component expressed as a numerical value.

9. The system as in claim 4, wherein the additional snapshot is obtained on a periodic schedule determined at least in part by the volatility of the at least one data component.

10. The system as in claim 4, wherein the additional snapshot is obtained in response to detecting a user input requesting the additional snapshot.

11. The system as in claim 1, wherein the one or more data components comprise a database statistic.

12. The system as in claim 1, wherein the one or more data components comprise a most common number.

13. A method, implemented at a computer system that includes one or more processors, for modifying weighting of database components by a query planner based on component volatility, comprising:

obtaining a plurality of snapshots of one or more datasets, the one or more datasets comprising one or more data components;

identifying a volatility for at least one data component of the one or more data components from the plurality of snapshots;

based on the volatility, generating a dynamic weight for the at least one data component, wherein the dynamic weight for the at least one data component comprises a time-dependent function that is proportional to the volatility of the at least one data component, and wherein the dynamic weight changes relative to temporal distance from when one or more of the snapshots, or statistics generated from the plurality of snapshots were generated; and initiating application of the dynamic weight for the at least one data component by a query planner, for computation of cost prediction, to the at least one data component.

14. The method as in claim 13, further comprising:

obtaining an additional snapshot of the one or more datasets;

detecting a volatility change of the at least one data component of the one or more data components;

based on the volatility change, calculating an updated dynamic weight for the at least one data component; and providing the updated dynamic weight to a query planner which utilizes the updated dynamic weight to calculate a computational cost for each of a plurality of different query plans.

15. The method as in claim 13, further comprising:

identifying a plurality of query plans comprising the at least one data component of the one or more data components in the one or more datasets;

calculating a computational cost for each of the plurality of query plans based at least on a first dynamic weight associated with the at least one data component; and initiating a selection by a query optimizer of a least computationally expensive query plan from the plurality of query plans.

16. The method as in claim 15, further comprising:

obtaining an additional snapshot of the one or more datasets;

detecting a volatility change of the at least one data component;

based on the volatility change, calculating an updated dynamic weight for the at least one data component;

initiating application of the updated dynamic weight by a query planner to the at least one data component; and recalculating the computational cost for each of the plurality of query plans.

17. The method as in claim 15, wherein the first dynamic weight comprises a time-dependent decay function that is inversely proportional to the volatility of the at least one data component.

18. The method as in claim 17, wherein first dynamic weight automatically updates and differentially affects the computational cost for each of the plurality of query plans based upon an amount of elapsed time since the query planner applied the first dynamic weight, wherein the first dynamic weight at any given time, referenced by y(t), is equal to a product of y(0) and $e^{kt}$, wherein y(0) is an initial value of the first dynamic weight, wherein e is the mathematical constant that is the base of the natural logarithm, wherein k is a specified constant, and wherein t is the amount of elapsed time.

19. The method as in claim 16, wherein the additional snapshot is obtained on a periodic schedule determined at least in part by the volatility of the at least one data component.

20. A computer program product comprising one or more computer-readable hardware storage media having stored thereon one or more computer-executable instructions that are executable by one or more processors of a computer system to cause the computer system to modify weighting of database components by a query planner based on component volatility by causing the computer system to perform at least the following:

obtain a plurality of snapshots of one or more datasets, the one or more datasets comprising one or more data components;

identify a volatility for at least one data component of the one or more data components from the plurality of snapshots;

based on the volatility, generate a dynamic weight for the at least one data component, wherein the dynamic weight for the at least one data component comprises a time-dependent function that is proportional to the volatility of the at least one data component, and wherein the dynamic weight changes relative to temporal distance from when one or more of the snapshots, or statistics generated from the plurality of snapshots were generated; and apply the dynamic weight for the at least one data component, for computation of cost prediction, to the at least one data components.

* * * * *